(12) United States Patent
Matuszczyk et al.

(10) Patent No.: US 12,545,879 B2
(45) Date of Patent: Feb. 10, 2026

(54) BIOPROCESS DEVICE ASSEMBLY AND INOCULATION METHOD

(71) Applicant: Sartorius Stedim Biotech GmbH, Göttingen (DE)

(72) Inventors: Jens-Christoph Matuszczyk, Göttingen (DE); Jochen Scholz, Göttingen (DE); Gerben Zijlstra, Göttingen (DE); Gerhard Greller, Göttingen (DE)

(73) Assignee: Sartorius Stedim Biotech GmbH, Göttingen (DE)

( * ) Notice: Subject to any disclaimer, the term of this patent is extended or adjusted under 35 U.S.C. 154(b) by 826 days.

(21) Appl. No.: 17/431,169

(22) PCT Filed: Feb. 12, 2020

(86) PCT No.: PCT/EP2020/053654
§ 371 (c)(1),
(2) Date: Aug. 15, 2021

(87) PCT Pub. No.: WO2020/169432
PCT Pub. Date: Aug. 27, 2020

(65) Prior Publication Data
US 2022/0135926 A1    May 5, 2022

(30) Foreign Application Priority Data
Feb. 20, 2019  (EP) .................... 19158305

(51) Int. Cl.
*C12M 1/00* (2006.01)
*C12M 1/26* (2006.01)
(Continued)

(52) U.S. Cl.
CPC ............ *C12M 33/07* (2013.01); *C12M 29/10* (2013.01); *C12M 41/12* (2013.01); *C12M 41/26* (2013.01);
(Continued)

(58) Field of Classification Search
CPC ...... C12M 27/16; C12M 29/10; C12M 33/00; C12M 33/07; C12M 41/00; C12M 41/12;
(Continued)

(56) References Cited

U.S. PATENT DOCUMENTS

| | | |
|---|---|---|
| 10,138,456 B2 | 11/2018 | Shimase et al. |
| 2016/0145563 A1* | 5/2016 | Berteau .................. C12M 41/48 137/15.01 |

FOREIGN PATENT DOCUMENTS

| | | |
|---|---|---|
| WO | 2006071716 A2 | 7/2006 |
| WO | 2015003012 A2 | 1/2015 |
| WO | 2018115161 A1 | 6/2018 |

OTHER PUBLICATIONS

International Search Report issued in International Application No. PCT/EP2020/053654, Issued Mar. 13, 2020, 3 pages.

* cited by examiner

*Primary Examiner* — Lydia Edwards
(74) *Attorney, Agent, or Firm* — Wolf, Greenfield & Sacks, P.C.

(57) ABSTRACT

A bioprocess device assembly includes at least a first bioreactor and a second bioreactor, and a transfer system for transferring a certain volume of a medium contained in the first bioreactor into the second bioreactor. A biomass sensor is associated to the first bioreactor. A control unit is configured for receiving measurement data from the biomass sensor and controlling the transfer system. An inoculation method makes use of such a device assembly wherein the biomass sensor measures at least one parameter of biomass contained in the first bioreactor; the biomass sensor sends measurement data to the control unit; and the control unit evaluates the measurement data and, based on an evaluation of the measurement data decides whether the viable cell density is sufficient for inoculation, determines a necessary (Continued)

inoculation volume, and controls the transfer system to transfer the determined inoculation volume from the first bioreactor into the second bioreactor.

19 Claims, 2 Drawing Sheets

(51) Int. Cl.
*C12M 1/34* (2006.01)
*C12M 1/36* (2006.01)
(52) U.S. Cl.
CPC ............ *C12M 41/34* (2013.01); *C12M 41/36* (2013.01); *C12M 41/44* (2013.01); *C12M 41/48* (2013.01)
(58) Field of Classification Search
CPC ...... C12M 41/26; C12M 41/34; C12M 41/36; C12M 41/44; C12M 41/46; C12M 41/48
See application file for complete search history.

BIOPROCESS DEVICE ASSEMBLY AND INOCULATION METHOD

RELATED APPLICATIONS

This Application is a national stage filing under 35 U.S.C. § 371 of International Patent Application Serial No. PCT/EP2020/053654, filed on Feb. 12, 2020, entitled "Bioprocess Device Assembly and Inoculation Method," which claims priority to European application No. 19158305.3, filed on Feb. 20, 2019, each of which is herein incorporated by reference in its entirety.

FIELD OF THE INVENTION

The invention relates to a bioprocess device assembly. The invention further relates to an inoculation method performed within a bioprocess.

BACKGROUND OF THE INVENTION

Process intensification usually refers to a strategy aimed at transforming established processes into more efficient and economical processes. The overall productivity is increased by streamlining operations and applying more advanced technologies. In the field of industrial bioprocessing, it is known to intensify fed-batch processes for mammalian cells by means of high cell seeding by an approach relying on a seed bioreactor (N−1 stage) operated in perfusion mode in order to reach elevated cell densities. Subsequently, the fed-batch bioreactor (N stage) is started at a cell concentration which is substantially higher than what is done with conventional fed-batch processes (Stettler et al: "Intensification of large-scale mammalian fed-batch processes", Pharmaceutical Bioprocessing, 2018 Volume 6, Issue 1).

Nevertheless, transfer of the inoculum from one bioreactor to the other is complicated and involves certain risks. In order to determine the viable cell density (VCD), which is one of the main criteria for a "good" inoculum" and used here as the representative method for measuring the viable biomass in a bioreactor, a sample has to be taken manually and examined off-line. If the measured VCD is not sufficient for effective inoculation, another sample has to be taken and examined later, and so on. If the intervals between the sample takings are long, e.g., one day, process time is usually wasted as it is very unlikely that a sample is taken exactly at the time when the desired, pre-determined VCD threshold value is first reached. On the other hand, if samples are taken frequently, this means increased effort for the process operator.

Moreover, after calculating a necessary inoculation volume depending on the actual VCD, transfer of the correct volume is controlled manually, which is also a laborious and error-prone task.

In general, when samples are taken and medium is transferred, each physical interaction with the bioreactors and the medium increases the risk of contamination.

SUMMARY OF THE INVENTION

It is an object of the invention to offer more control over a bioprocess, especially with regard to a precise transfer of cell cultures for inoculation, and to make the bioprocess thus more efficient.

The above object is achieved by a bioprocess device assembly according to claim 1 and also by an inoculation method performed within a bioprocess according to claim 6.

Advantageous and expedient embodiments of the invention are apparent from the associated dependent claims.

The invention provides a bioprocess device assembly, comprising at least a first bioreactor and a second bioreactor, and a transfer system for transferring a certain volume of a medium contained in the first bioreactor into the second bioreactor. The bioprocess device assembly further comprises a biomass sensor associated to the first bioreactor for measuring at least one parameter relating to the quantity and/or quality of the biomass contained in the first bioreactor, and a control unit configured for receiving measurement data from the biomass sensor and controlling the transfer system. The control unit is parametrized such that, based on an evaluation of the measurement data received from the biomass sensor, it decides whether the biomass status, preferably the viable cell density (VCD), is sufficient for inoculation, determines a necessary inoculation volume, and controls the transfer system to transfer the determined inoculation volume from the first bioreactor into the second bioreactor.

The invention is based on the general finding that online-monitoring of critical bioprocess parameters, especially VCD, offers the potential of significantly improving process stability, reducing process time, and enhancing process performance. In fact, VCD of the inoculum is considered as decisive parameter for quality and reproducibility of subsequent steps. Accordingly, the most important requirement of optimal control of all follow up steps is inoculation with a precise VCD.

According to the invention, a biomass sensor is provided for online measuring of at least one parameter relating to the quantity and/or quality of the biomass contained in the first (pre-culture) bioreactor. Online monitoring of this parameter, especially VCD, makes it possible to perform inoculation as soon as the parameter has reached a desired, pre-determined threshold value, i.e., without substantial delay.

The invention is based on the further finding that VCD can be determined online by measuring the capacitance of the biomass when the corresponding bioreactor is operated in a perfusion mode. In this case, certain cell parameters that would otherwise change significantly over time, e.g., increasing cell diameter due to swelling of the cells, remain rather constant so that their influence on the capacitance-VCD correlation is not detrimental.

As already indicated, it is preferred that the biomass sensor is at least capable of measuring capacitance. This can be either capacitance measurements at a single frequency as well as multi-frequency capacitance measurements (also referred to as capacitance scanning or capacitance spectroscopy).

It is to be noted that the quantity and/or quality of the biomass can be measured by a "soft" biomass sensor, i. e. by measuring a parameter or a combination of parameters which is/are dependent on the biomass. Therefore, in addition or in the alternative, the biomass sensor can also be capable of measuring at least one of the following: electrical impedance; oxygen transmission rate (OTR); oxygen uptake rate (OUR); scattered light; radiation intensity; concentration of a metabolite (e.g., glucose); metabolite (e.g., glucose) consumption rate; product formation rate. Regarding the latter, spectrometry allows monitoring the protein content in the harvest stream. Together with a constant cell-specific product formation rate this can be used as a reliable indicator for biomass. If necessary or expedient, several parameters can be measured and evaluated in combination.

The biomass sensor and the control unit are preferably configured for monitoring the at least one parameter and controlling the transfer system in real-time. This means that measurement data is delivered and evaluated immediately after collection, so that the transfer system can be activated without (significant) delay after certain conditions are met.

The transfer system for transferring medium from the first bioreactor into the second bioreactor can be of any suitable type. In particular, the transfer system can include at least one of the following controllable conveyor devices: pump; pneumatic drive; gravimetric feeder. A flow meter and/or other devices can be used to control the transferred inoculation volume.

The invention further provides an inoculation method performed within a bioprocess making use of a device assembly according to the invention. The inoculation method comprises the following steps: the biomass sensor constantly or repeatedly measures at least one parameter relating to the quantity and/or quality of the biomass contained in the first bioreactor; the biomass sensor sends measurement data to the control unit; and the control unit evaluates the measurement data received from the biomass sensor and, based on an evaluation of the measurement data decides whether the biomass status, preferably the viable cell density (VCD), is sufficient for inoculation, determines a necessary inoculation volume, and controls the transfer system to transfer the determined inoculation volume from the first bioreactor into the second bioreactor.

Preferably, the steps of evaluating the measurement data received from the biomass sensor and controlling the transfer system to transfer the determined inoculation volume from the first bioreactor into the second bioreactor are performed in real-time.

To ensure optimum process performance, the necessary inoculation volume should be calculated based on the evaluated measurement data of the biomass sensor, because the required inoculation volume largely depends on the viable cell density of the inoculum.

Transfer of the inoculation volume can basically be performed in many different ways. In particular, one of the following driving principles can be used: hydraulic pressure; pneumatic pressure; gravity.

The first bioreactor is preferably operated in a perfusion mode. Perfusion is not only beneficial in view of bioprocess intensification, but in perfusion mode the correlation between the measured parameter, especially capacitance, is not impaired by side effects like swelling of the cells etc.

Apart from the calculation of the necessary inoculation volume, its advantageous to adapt or adjust the initial conditions in the second bioreactor and/or process control and process parameters of the second bioreactor depending on at least one of the following: amount or concentration of a metabolite in the transferred inoculation volume; one or more physicochemical characteristics of the transferred inoculation volume, in particular pH, oxygen saturation, temperature.

The inventive concept is scalable. If a cascade of pre-culture bioreactors (Ni, . . . N−1) is used in the bioprocess, the method according to the invention can be performed multiple times within the cascade of bioreactors.

BRIEF DESCRIPTION OF THE DRAWINGS

Further features and advantages of the invention will become apparent from the following description and from the accompanying drawings to which reference is made. In the drawings.

DETAILED DESCRIPTION OF THE INVENTION

Figure 1:
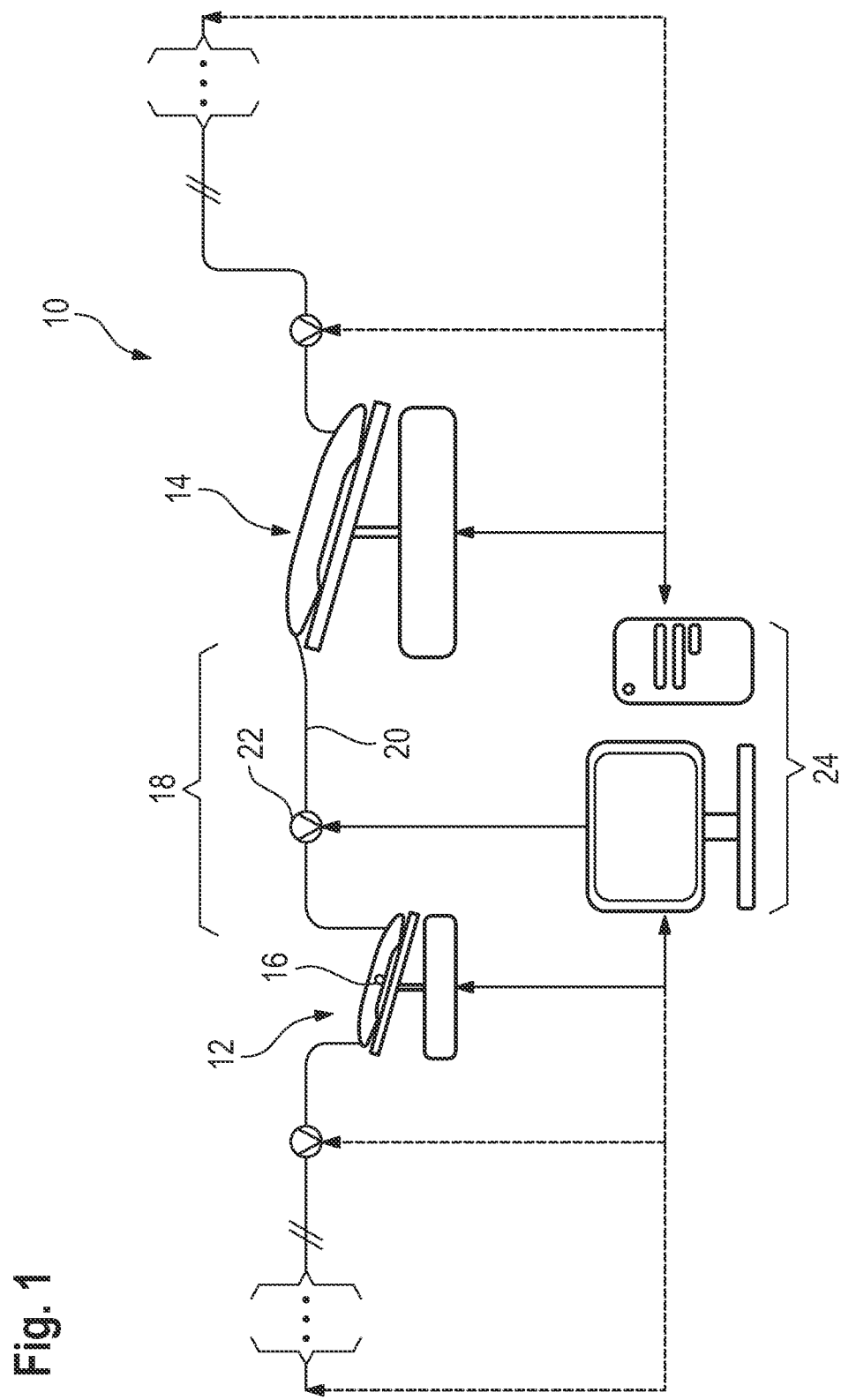
FIG. 1 shows an example setup of a bioprocess device assembly according to the invention using a control system.

FIG. 1 schematically depicts a possible setup of a bioprocess device assembly 10 for performing an inoculation within a fed-batch bioprocess. The bioprocess device assembly 10 includes at least two bioreactors 12, 14. The first bioreactor 12 is used as a seed bioreactor (N−1 stage) and preferably operated in a perfusion mode, while a second bioreactor 14 is used as a fed-batch bioreactor (N stage). The bioreactors 12, 14 shown in FIG. 1 are both rocking motion (RM) bioreactors.

The first bioreactor 12 is equipped with a biomass sensor 16 for measuring at least one parameter relating to the quantity and/or quality of the biomass contained in the first bioreactor 12. The biomass sensor 16 preferably is or includes a capacitance sensor. In addition, or alternatively, the biomass sensor 16 may be capable of measuring at least one of the following parameters or any derivative thereof: electrical impedance; oxygen transmission rate (OTR); oxygen uptake rate (OUR); scattered light; radiation intensity; concentration of a metabolite (e.g., glucose); metabolite (e.g., glucose) consumption rate; product formation rate.

A transfer system 18 makes it possible to transfer a medium contained in the first bioreactor 12 into the second bioreactor 14. In the example embodiment shown in FIG. 1 the transfer system 18 includes a hose line 20 connecting the two bioreactors 12, 14 and a controllable pump 22 integrated in the hose line 20. However, other automatically or semi-automatically controllable transfer concepts may be employed. In particular, the transfer system 18 may also include a pneumatic drive, a gravimetric feeder, or the like.

The biomass sensor 16 and the transfer system 18 are connected to a control unit 24 which is configured for receiving measurement data from the biomass sensor 16 and for controlling the transfer system 18. The control unit 24 can be a specific unit mainly dedicated for these purposes, or it can be a flexible digital control unit which is generally capable of performing a variety of process control operations. In any event, the control unit 24 may be part of, or connected to, a higher level control system for controlling several or all steps in a bioprocess.

The control unit 24 is capable of controlling the transfer system 18 such that a previously determined amount of medium contained in the first bioreactor 12, in particular an inoculation volume, is transferred from the first bioreactor 12 into the second bioreactor 14. For exactly measuring the weight or volume of the transferred amount of medium one or more weight and/or volume sensors associated to one or both of the bioreactors 12, 14 are connected to the control unit 24.

The control unit 24 itself is parametrized such that, based on an evaluation of the measurement data received from the biomass sensor 16 in the first bioreactor 12, the control unit 24 performs the following steps:
 (a) deciding whether the viable cell density (VCD) is sufficient for inoculation,
 (b) determining a necessary inoculation volume, and (c) controlling the transfer system 18 to transfer the determined inoculation volume from the first bioreactor 12 into the second bioreactor 14.

Figure 2:
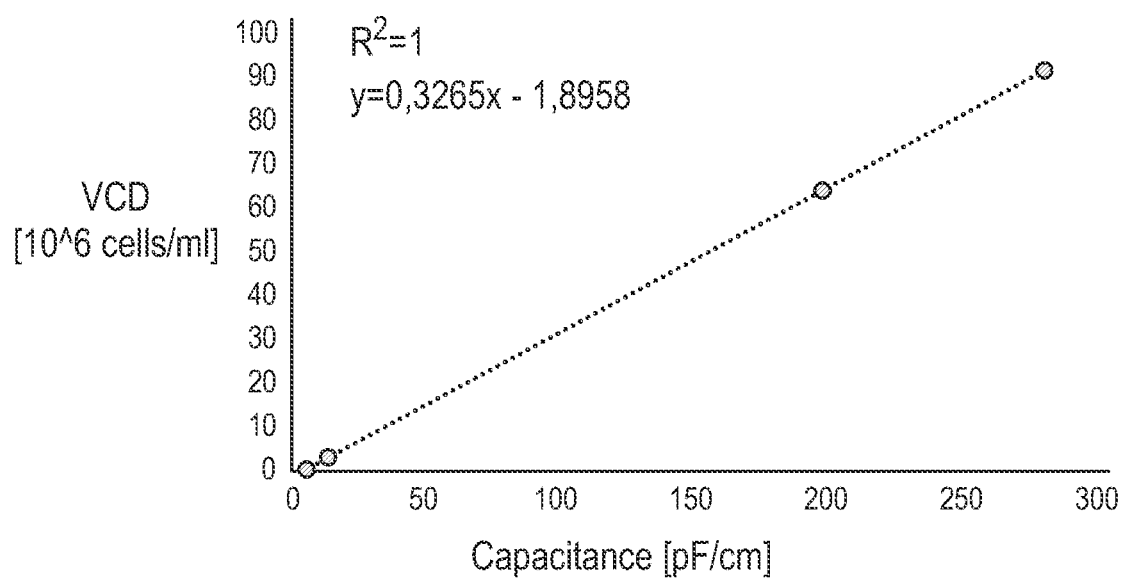
FIG. 2 shows an example correlation between viable cell density and capacitance.

The parametrization of the control unit 24 is based on a known correlation between VCD and the parameter(s) measured by the biomass sensor 16, especially capacitance. The correlation was determined earlier empirically or, especially if empirical data is not available, in parallel to the actual seed steps. The correlation can also be obtained by modelling. The correlation is stored in the control unit 24. An example of a substantially linear correlation between VCD and capacitance is shown in the diagram of FIG. 2.

The inoculation within the bioprocess is performed as follows. The biomass sensor 16 continuously or repeatedly provides measurement data to the control unit 24, and the control unit 24 continuously or repeatedly evaluates the measurement data in real-time (online monitoring). When the control unit 24 determines, based on the above-mentioned known correlation, that the VCD is sufficient or has reached a desired, pre-determined threshold value, inoculation is immediately and automatically initiated.

Before the actual medium transfer from the first bioreactor 12 into the second bioreactor 14, the control unit 24 determines a necessary amount of biomass for inoculation (inoculation volume) according to the present circumstances, especially based on the measured VCD. The medium transfer is then automatically activated by the control unit 24.

In the example embodiment shown in FIG. 1 the transfer of the inoculation volume is mainly performed by operating the pump 22 in the hose line 20 between the two bioreactors 12, 14. Operation of the pump 22 (at least starting and stopping the pump 22) is controlled by the control unit 24. Additionally, valves for opening and closing the bioreactor ports connected to the hose line 20 may also be controlled by the control unit 24. If another type of transfer system is used, e.g., based on a pneumatic drive, a gravimetric feeder, or the like, the control unit 24 controls these components accordingly.

As soon as the calculated amount of inoculation volume is transferred by the transfer system 18, the control unit 24 automatically terminates the medium transfer based on the measurement data received from the weight and/or volume sensor(s).

The amount or concentration of metabolites, e.g., glucose, contained in the inoculation volume and/or one or more physicochemical characteristics of the inoculation volume, such as pH, oxygen saturation (dissolved oxygen, DO), temperature etc., are determined by calculation or measurement. Based on the determined value(s), the initial conditions in the second bioreactor 14 are adapted or adjusted accordingly to the new amount of metabolites and/or physicochemical characteristics. The same can be done with the process control and process parameters (PID) of the second bioreactor 14, i.e., they can be adapted or adjusted according to the determined value(s).

An optional biomass sensor may be provided in the second bioreactor 14 for examining the effectively transferred biomass.

Figure 3:
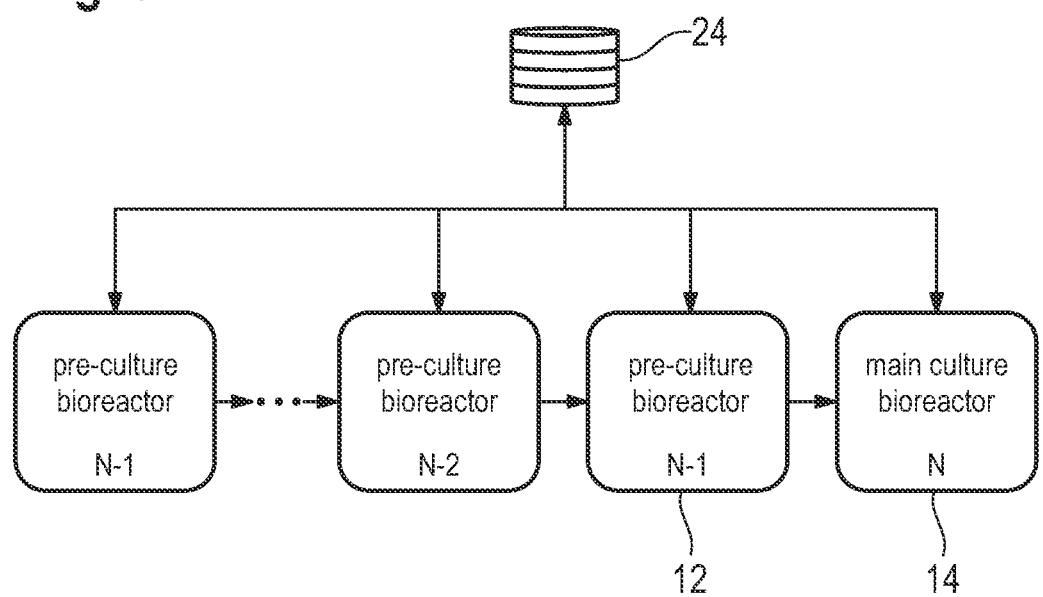
FIG. 3 shows generally a cascade of a plurality of controlled bioreactors in an assembly according to the invention.

The above-described concept, or parts of it, can be scaled up as indicated by the dashed lines in FIG. 1. In particular, the transfer of medium between several pre-culture bioreactors (N−x stage to N−x+1 stage) can be automatically initiated and automatically performed as described above with the same control unit 24 or several control units. A corresponding cascade of controlled bioreactors is generally shown in FIG. 3.

LIST OF REFERENCE SIGNS 10 bioprocess device assembly
12 first bioreactor
14 second bioreactor
16 biomass sensor
18 transfer system
20 hose line
22 pump
24 control unit

The invention claimed is:

1. A bioprocess device assembly, comprising:
at least a first bioreactor and a second bioreactor, wherein the first bioreactor is a rocking motion bioreactor,
a transfer system for transferring a certain volume of a medium contained in the first bioreactor into the second bioreactor,
a biomass sensor associated with the first bioreactor for measuring at least one parameter relating to a quantity and/or a quality of biomass contained in the first bioreactor, wherein the biomass sensor is a single-frequency capacitance sensor, a scattered light sensor, and/or a light intensity sensor, and
a control unit configured for receiving measurement data from the biomass sensor and controlling the transfer system,
the control unit being parametrized such that, based on an evaluation of the measurement data received from the biomass sensor, the control unit:
(a) decides whether a biomass status is sufficient for inoculation,
(b) determines a necessary inoculation volume, and
(c) controls the transfer system to transfer the determined inoculation volume from the first bioreactor into the second bioreactor.

2. The bioprocess device assembly according to claim 1, wherein the biomass sensor and the control unit are configured for monitoring the at least one parameter and controlling the transfer system in real-time.

3. The bioprocess device assembly according to claim 1, wherein the transfer system includes at least one of the following controllable conveyor devices: a pump; a pneumatic drive; a gravimetric feeder.

4. An inoculation method performed within a bioprocess, the method making use of a bioprocess device assembly according to claim 1 and comprising the following steps:
the biomass sensor constantly or repeatedly measuring at least one parameter relating to the quantity and/or quality of the biomass contained in the first bioreactor;
the biomass sensor sending measurement data to the control unit; and
the control unit evaluating the measurement data received from the biomass sensor and, based on an evaluation of the measurement data:
(a) deciding whether the biomass status is sufficient for inoculation,
(b) determining the necessary inoculation volume, and
(c) controlling the transfer system to transfer the determined inoculation volume from the first bioreactor into the second bioreactor.

5. The method according to claim 4, wherein the steps of evaluating the measurement data received from the biomass sensor and controlling the transfer system to transfer the determined inoculation volume from the first bioreactor into the second bioreactor are performed in real-time.

6. The method according to claim 4, wherein the necessary inoculation volume is calculated based on the evaluated measurement data of the biomass sensor.

7. The method according to claim 4, wherein the transfer of the inoculation volume is performed based on one of the following driving principles: hydraulic pressure; pneumatic pressure; gravity.

8. The method according to claim 4, wherein the first bioreactor is operated in a perfusion mode.

9. The method according to claim 4, wherein initial conditions in the second bioreactor and/or process control and process parameters of the second bioreactor are adapted or adjusted depending on at least one of the following: an amount or concentration of a metabolite in the transferred inoculation volume; one or more physicochemical characteristics of the transferred inoculation volume.

10. The method according to claim 4, wherein the method is performed multiple times with a cascade of pre-culture bioreactors.

11. The method according to claim 9, wherein the one or more physicochemical characteristics of the transferred inoculation volume include at least one of pH, oxygen saturation, or temperature.

12. The method according to claim 4, wherein the biomass status is a viable cell density.

13. The bioprocess device assembly according to claim 1, wherein the biomass status is a viable cell density.

14. The bioprocess device assembly according to claim 1, further comprising a second biomass sensor associated with the second bioreactor, wherein the second biomass sensor is configured to examine the transferred medium.

15. The bioprocess device assembly according to claim 1, further comprising a rocker.

16. The bioprocess device assembly according to claim 1, wherein the biomass sensor is a single-frequency capacitance sensor.

17. The bioprocess device assembly according to claim 1, wherein the biomass sensor is a scattered light sensor.

18. The bioprocess device assembly according to claim 1, wherein the biomass sensor is a light intensity sensor.

19. A bioprocess device assembly, comprising:
- at least a first bioreactor and a second bioreactor, wherein the first bioreactor is a rocking motion bioreactor,
- a transfer system for transferring a certain volume of a medium contained in the first bioreactor into the second bioreactor,
- a first biomass sensor associated with the first bioreactor for measuring at least one parameter relating to a quantity and/or a quality of biomass contained in the first bioreactor,
- a second biomass sensor associated with the second bioreactor, wherein the second biomass sensor is configured to examine the transferred medium, and wherein the second biomass sensor is a single-frequency capacitance sensor, a scattered light sensor, and/or a light intensity sensor, and
- a control unit configured for receiving measurement data from the first biomass sensor and controlling the transfer system,
- the control unit being parametrized such that, based on an evaluation of the measurement data received from the first biomass sensor, the control unit:
  (a) decides whether a biomass status is sufficient for inoculation,
  (b) determines a necessary inoculation volume, and
  (c) controls the transfer system to transfer the determined inoculation volume from the first bioreactor into the second bioreactor.

* * * * *